March 15, 1932.  F. MÜCHLER  1,849,948
HOSE CLIP
Filed July 23, 1931
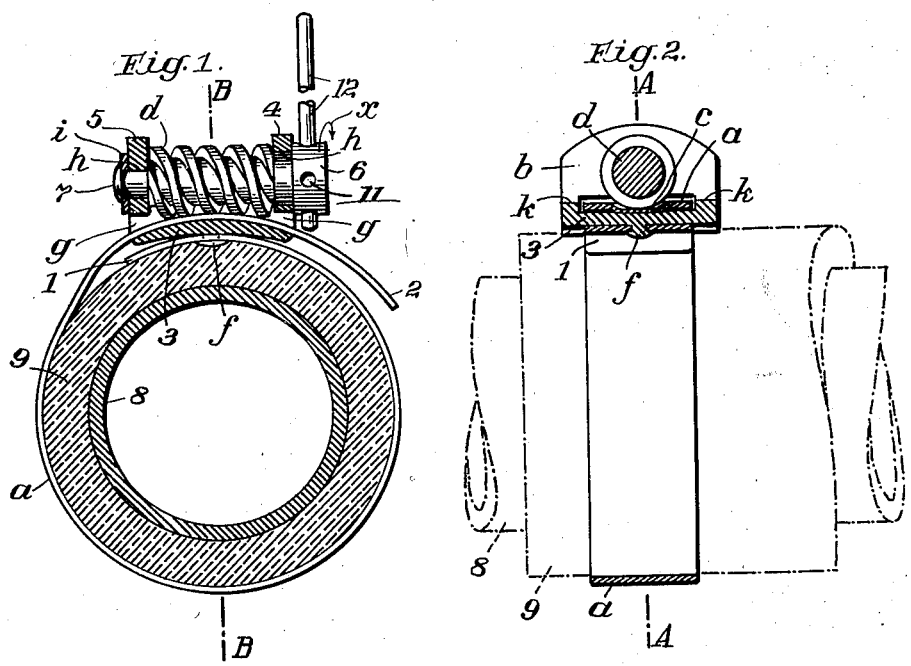
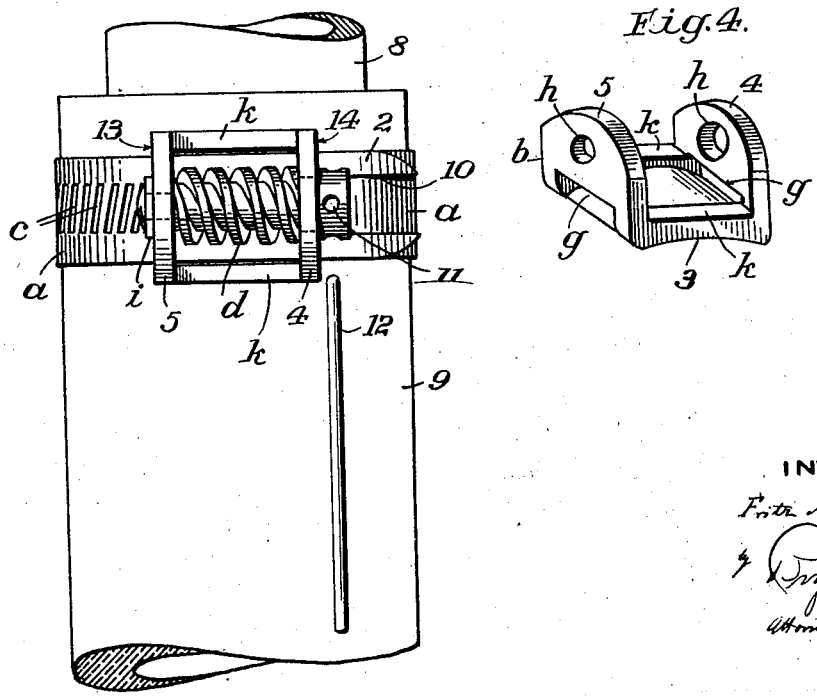
INVENTOR:
Fritz Müchler
by Bryant & Lowry
Attorneys Patented Mar. 15, 1932

1,849,948

UNITED STATES PATENT OFFICE

FRITZ MÜCHLER, OF METTMANN, GERMANY

HOSE CLIP

Application filed July 23, 1931, Serial No. 552,743, and in Germany February 8, 1930.

This invention relates to hose clips, in which one end of a flexible metal band carries a bearing for a screw, in which the other end of the band provided on the outer side with a toothed portion for the engagement of the screw is guided.

The invention has for its object to produce a simple and cheap hose clip which can be produced with a minimum amount of material and with which it is possible to dispense with a separate safety allowance of material against overstressing so that besides the saving in material, owing to the thinnest possible dimensions of the material, a better fitting on the cross section to be embraced is ensured. The material most suitable for hose clips can be used, for example brass or thin soft sheet iron, and it can be very thin so that jamming of the band ends need not be feared. Such jamming occurs frequently in hose clips, the band ends of which are arranged in a bearing, made of a pressed sheet metal strip, the ends of which directed towards the clip band, embrace the two clip ends.

Further aims and advantages of the invention are set forth in the following description in conjunction with the accompanying drawings, which shows by way of example a form of construction according to the invention, Fig. 1 being a section on line A—A of Fig. 2, Fig. 2 is a section on line B—B of Fig. 1, Fig. 3 a top plan view with the fixing pin for the screw of the clip, shown separately and Fig. 4 a perspective view of the clip with the screw removed.

8 designates the pipe end on which the end 9 of a hose is fixed.

The hose clip consists of a flexible metal band $a$, preferably made of brass and fixed with one end 1 in a bearing $b$, in which the other end 2 of the band is guided. Along a suitable length of the band end 2 a toothed portion $c$ is provided. The bearing $b$ consists of a rigid U-shaped block, which is preferably cast. The block may however also be forged or formed of a suitably bent band. This block is fixed at its middle part 3 to the band end 1, for example by means of a rivet $f$ cast on the block. Evidently a plurality of rivets may also be employed, or the bearing block may be fixed by welding or screws. At the points of transition from the middle part 3 into the arms 4, 5 the block $b$ has a slot $g$ for the passage and guiding of the adjustable band end 2. Further on the longitudinal edges of the middle part 3 upwardly projecting guide bars $k$ for the band are provided. Owing to the slot guiding in the U-shaped rigid block, the screw and the band end remain continually movable and are easy to clean and if necessary to lubricate so that the clip can be removed without difficulty, even after it has remained fitted for a long time on a hose. The arms 4 and 5 of the block have two coaxial holes 8, in which the smooth cylindrical portions of a screw $d$ are rotatably mounted. The screw $d$ bears at one end with its head 6 against one of the block arms 4, whereas it is supported on the other arm 5 by means of the upset shank end 7 of the screw and a washer $i$. The middle part 3 of the block $b$ is preferably curved or domed in the longitudinal direction of the band $a$. The outer surface of the middle part 3 directed towards the screw $d$ is more strongly curved than that directed towards the hose so that the toothed outer side of the band $a$ comes reliably into mesh with the screw $d$. The middle part of the free end 2 of the band is cut out in U-shape 10 from the band end, corresponding to the width of the toothed portion so that the band end can be easily inserted through the slots of the bearing, before the tightening of the clip by the screw $d$. The length of the U-shaped cut out portion preferably corresponds to the distance between the outer surfaces 13 and 14 of the block arms 4 and 5.

The screw head 6 is provided with one or a plurality of transverse bores 11, the diameter of which is so small that only a pin 12 can be inserted therein, which bends when the desired clamping pressure is reached. The length of the pin 12 is such that it can be easily gripped after insertion and thereby offers sufficient leverage for the weakest persons. The transverse bores for inserting the fixing pin are preferably situated close to the arm 4 near the screw head so that the pin 12 always only projects on one side a sufficient distanct for gripping with the fingers. Owing to the actuating of the screw by means of a pin, the diameter of which is determined by the size of the transverse bore and is dependent upon the clamping pressure to be attained, an overturning of the screw or the band thread cannot be effected, even by the strongest persons. On the other hand, even the weakest persons can easily and reliably tighten the clip. Owing to the possibility of actuating the clamping screw in dependency upon the clamping pressure of the clip, the excess material, necessary for preventing overturning, can be omitted. Above all the life is increased, relative to the known clips, in which as a rule a new clip is required after each loosening.

After inserting the pin 12 in one of the transverse bores in the screw head, the screw is turned in the direction of the arrow X (Fig. 1) and thus the clip is tightened. When the desired clamping pressure is reached, the pin bends so that a tighter clamping is no longer possible. The pin is then thrown away. For loosening and retightening of the clip a new pin is employed. Any desired number of pins may be supplied with the clip.

In the example illustrated, the toothed portion on the band is stamped.

I claim:—

1. A hose clip, comprising in combination a U-shaped block having a base and arms extending therefrom forming a screw bearing, a screw rotatably mounted in said bearing, a flexible metal band attached at one end to said block, the arms of said block extending perpendicularly transversely to the longitudinal direction of said band and having each a slot at its junction with the base for the insertion and guiding of the free end of said band, and a toothed portion on said band adapted to engage with said screw.

2. A hose clip as specified in claim 1, in which the U-shaped block is cast and riveted to the band end by a pin cast on the middle part of the block.

3. A hose clip as specified in claim 1, in which the end of the band, extending through the slots in the U-shaped body, is cut out in U-shape to a width corresponding to that of the toothed portion of the band.

4. A hose clip as specified in claim 1, in which the end of the band, extending through the slots in the U-shaped body, is cut out in U-shape to a length corresponding to the distance between the outer surfaces of the block arms.

5. A hose clip, comprising in combination a flexible band, a U-shaped screw bearing block on one end of said band having apertures for guiding the free end of said band, a toothed portion near the free end of said band, a screw in said bearing block, a head of said screw having transverse bores, and a pin corresponding in diameter to that of the bores adapted to be inserted in said bores, the diameter of said bores and consequently of said pin being so small that said pin, of a length sufficient for a gripping with the fingers, deforms when the desired clamping pressure of the clip is reached.

6. A hose clip, comprising in combination a flexible band, a U-shaped screw bearing block on one end of said band having apertures for guiding the free end of said band, a toothed portion near the free end of said band, a screw in said bearing block, a head of said screw having transverse bores close to the arm of said block near said screw head, and a pin corresponding in diameter to that of the bores adapted to be inserted in said bores, the diameter of said bores and consequently of said pin being so small that said pin, of a length sufficient for a gripping with the fingers, deforms when the desired clamping pressure of the clip is reached.

In testimony whereof I affix my signature.

FRITZ MÜCHLER.